US009062963B2

(12) United States Patent
Furuta et al.

(10) Patent No.: US 9,062,963 B2
(45) Date of Patent: Jun. 23, 2015

(54) THICKNESS MEASUREMENT SYSTEM AND THICKNESS MEASUREMENT METHOD

(71) Applicant: Kabushiki Kaisha Toshiba, Minato-ku, Tokyo (JP)

(72) Inventors: Tetsuo Furuta, Hachioji (JP); Teruo Ishizuka, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/290,231

(22) Filed: May 29, 2014

(65) Prior Publication Data

US 2014/0268183 A1    Sep. 18, 2014

Related U.S. Application Data

(63) Continuation of application No. PCT/JP2012/083482, filed on Dec. 25, 2012.

(30) Foreign Application Priority Data

Dec. 27, 2011    (JP) ................................. 2011-287010

(51) Int. Cl.
*G01B 11/28*    (2006.01)
*G01B 11/06*    (2006.01)
*G01B 5/00*    (2006.01)

(52) U.S. Cl.
CPC .............. *G01B 11/06* (2013.01); *G01B 5/0011* (2013.01); *G01B 11/0691* (2013.01)

(58) Field of Classification Search
CPC .......................................................... G01B 11/28
USPC .......................................................... 356/630
See application file for complete search history.

(56) References Cited

U.S. PATENT DOCUMENTS 5,599,014 A * 2/1997 Kitahara et al. .............. 271/270

FOREIGN PATENT DOCUMENTS

| JP | 62-287114 A | 12/1987 |
| JP | 2000-081328 A | 3/2000 |
| JP | 2003-227707 A | 8/2003 |

(Continued)

OTHER PUBLICATIONS

Notice of Examination Results mailed by Taiwan Intellectual Property Office on Aug. 7, 2014 in the corresponding Taiwanese patent application No. 101150534—6 pages.
International Search Report mailed by Japan Patent Office on Mar. 26, 2013 in the corresponding PCT patent application No. PCT/JP2012/083482—5 pages.

(Continued)

*Primary Examiner* — Roy M Punnoose
(74) *Attorney, Agent, or Firm* — Knobbe, Martens, Olson & Bear LLP

(57) ABSTRACT

Thickness measurement apparatuses 1 and 2 are set a preset distance Ld from each other. The first apparatus 1 performs calibration using a thickness reference plate 5c. While the second apparatus 2, placed on a downstream side in a conveying direction, is performing measurement process, mode setter 3 sets "measurement" for the first apparatus 1. Mode setter 3 further gives an instruction to start a "thickness correction" process to the second apparatus 2. Mode setter 3 delays a first thickness measurement value 1 until a position corresponding to the distance is reached in a traveling distance, determines the difference between the first value 1 and a second thickness measurement value 2 from the second apparatus 2 as a correction value, and executes thickness correction without halting the measurement performed by the second apparatus 2.

3 Claims, 3 Drawing Sheets

(56) References Cited

FOREIGN PATENT DOCUMENTS

| JP | 2004-108961 A | 4/2004 |
|---|---|---|
| JP | 2005-083820 A | 3/2005 |
| TW | 201003034 | 1/2010 |

OTHER PUBLICATIONS

English translation of International Preliminary Report on Patentability mailed by the International Bureau of WIPO on Jul. 10, 2014 in the corresponding PCT application No. PCT/JP2012/083482, including written opinion—6 pages.

* cited by examiner

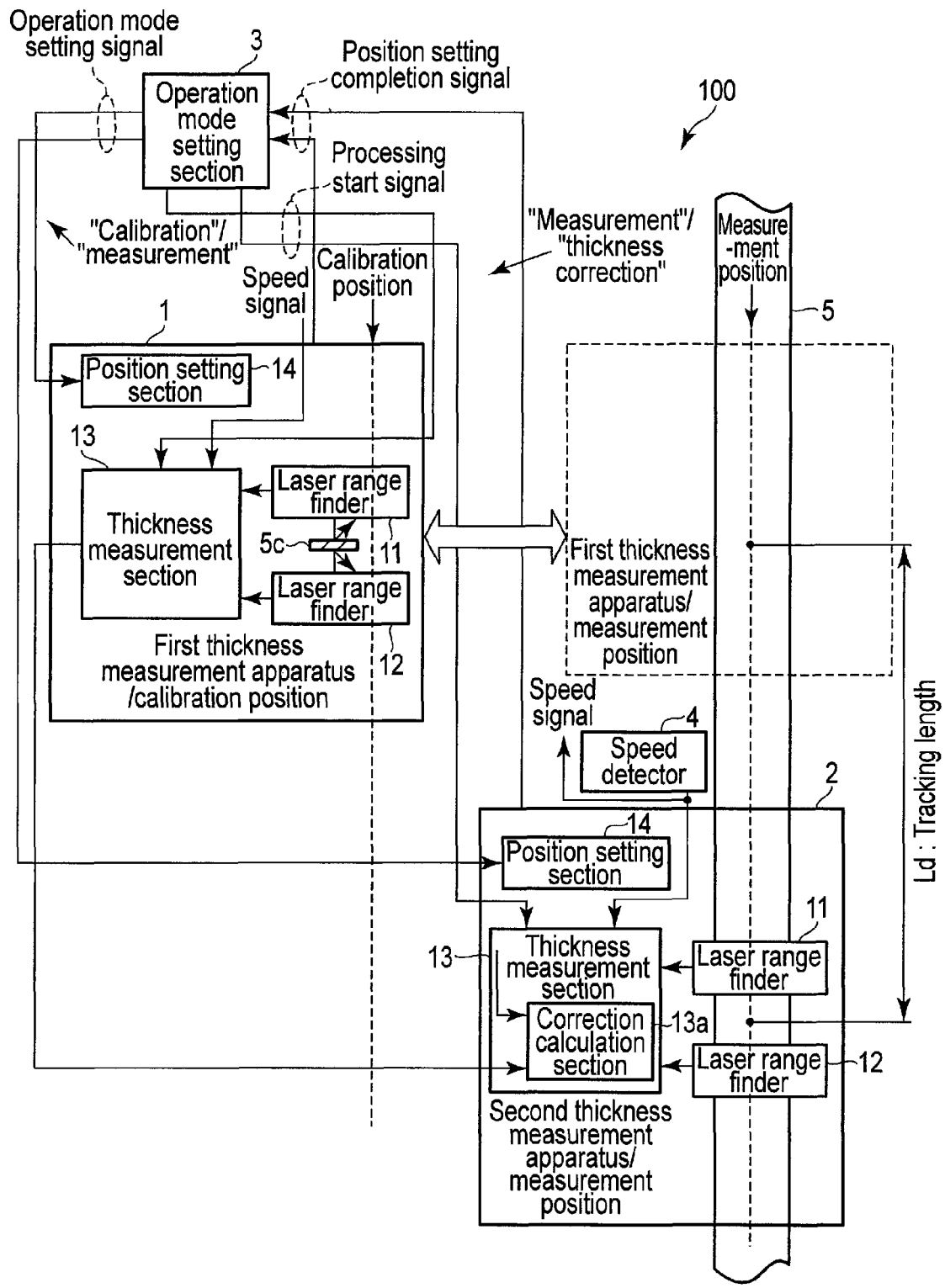
F I G. 1

US 9,062,963 B2

THICKNESS MEASUREMENT SYSTEM AND THICKNESS MEASUREMENT METHOD

CROSS-REFERENCE TO RELATED APPLICATION

This application is a Continuation Application of PCT Application No. PCT/JP2012/083482, filed Dec. 25, 2012 and based upon and claiming the benefit of priority from prior Japanese Patent Application No. 2011-287010, filed Dec. 27, 2011, the entire contents of all of which are incorporated herein by reference.

FIELD

Embodiment described herein relates generally to a thickness measurement system and a thickness measurement method in which the thickness of a plate is measured using a laser range finder.

BACKGROUND

Radiation thickness gauges using radiation have been used as main apparatuses for measuring the thickness of a plate rolled by a rolling mill. These radiation thickness gauges include X ray thickness gauges using X rays and y ray thickness gauges using y rays. The radiation thickness gauges have an ensured thickness measurement accuracy of 0.1% and have been used for quality control for normal plate thicknesses.

However, the radiation thickness gauge fails to focus a beam system for radiation and thus provides an insufficient spatial resolution. Furthermore, the radiation thickness gauge needs a process for eliminating the adverse effect of noise, leading to a commensurate reduction in response speed. Thus, the radiation thickness gauge has difficulty detecting variations in plate thickness which are long in the width direction of the plate to be rolled and which occur at a constant pitch in the traveling direction, such as chatter marks resulting from mechanical vibration of the rolling mill or roll marks resulting from deformation of or damage to the rolling mill.

That is, detection of chatter marks or roll marks needs a thickness measurement accuracy of 0.1% or several micrometers or less in absolute value. Furthermore, a resolution is needed which allows the varying speed and shape of the plate being moved to be dealt with. Specifically, the detection needs a measuring spatial resolution of 10 mm and a response speed of 1 msec. or less. Thus, for thickness measurement demanding a high resolution, a thickness measurement apparatus 200 based on a laser range finder utilizing laser light as shown in FIG. 5 is used instead of the radiation thickness gauge.

The thickness measurement apparatus 200 includes a C-shaped frame 15 and a thickness calculation section 113. The C-shaped frame 15 includes an upper arm portion 15T and a lower arm portion 15B equipped with a first laser range finder 11 and a second laser range finder 12, respectively. The first laser range finder 11 and a second laser range finder 12 are arranged so that a measurement surface of the first laser range finder 11 lies opposite a measurement surface of the second laser range finder 12. The distance between the measurement surfaces of the first laser range finder 11 and the second laser range finder 12 is denoted by Lo. The C-shaped frame 15 is disposed such that the measurement surfaces of the first laser range finder 11 and the second laser range finder 12 lie opposite a top surface and a bottom surface, respectively, of a measurement target (a plate moved while being rolled) 5. The first laser range finder 11 and the second laser range finder 12 each include a laser light source section, a CCD camera, and a distance calculation section (none of which are shown in the drawings). Laser light output by the laser light source section is delivered to a surface of the measurement target 5. Reflected light from the measurement target 5 is received by the CCD camera, which converts the light into an electric signal. The electric signal is input to the distance calculation section. The distance calculation section detects a change in the input electric signal, and based on the detection result, calculates and determines distances La and Lb between the measurement target 5 and the measurement surfaces of the first laser range finder 11 and the second laser range finder 12. The distance calculation section then sends the determined distances La and Lb to a thickness calculation section 113, which executes a calculation in accordance with Formula (1) to determine the thickness t of the measurement target 5.

$$t = Lo - (La + Lb) \quad (1)$$

However, disadvantageously, in the thickness measurement apparatus 200, when the distance Lo between the arm portions 15T and 15B of the C-shaped frame 15, to which the first laser rangefinder 11 and the second laser range finder 12 are fixed, is varied by a change in ambient temperature, the variation itself corresponds to a measurement error as indicated by Formula (1). Thus, effort has been made to improve the structure and material of the C-shaped frame 15 in order to suppress a variation in distance Lo. Furthermore, various calibration methods have been proposed which are intended to deal with a temperature drift caused by the variations.

A method for the thickness measurement apparatus 200 involves performing calibrations at intervals (for example, every 5 seconds or shorter) smaller than a time rate of change for thermal shrinkage of the C-shaped frame 15 so as to avoid affecting production of the measurement target 5.

Another method for the thickness measurement apparatus 200 uses a chatter mark detection apparatus. The chatter mark detection apparatus includes both a thickness measurement apparatus 200 based on a laser with a high resolution and a thickness gauge based on radiation and which is unsusceptible to a variation in distance. The chatter mark detection apparatus determines, as a correction value for the temperature drift, the difference between an output from the radiation thickness gauge and an output from the laser thickness measurement apparatus 200 to correct the output from the thickness measurement apparatus 200 based on the correction value.

One known laser thickness measurement apparatus needs a large swing arm located at a measurement position on a production line on which a measurement target is conveyed, to set a calibration sample in a short time. This disadvantageously leads to an increase in the size of a calibration apparatus. The laser thickness measurement apparatus also needs to set a state in which no measurement target is present. This disadvantageously results in the need to halt the production of the measurement target, though the halt lasts only a short time.

Other known thickness measurement apparatus enables continuous measurement and solves the problem of the halt of the production. However, the thickness measurement apparatus uses radiation and thus needs special measures for safety management for radiation, for example, provision of a safety management zone.

BRIEF DESCRIPTION OF THE DRAWINGS

FIG. 1 is a block diagram showing a configuration of a thickness measurement system according to an embodiment;

DETAILED DESCRIPTION

Figure 2:
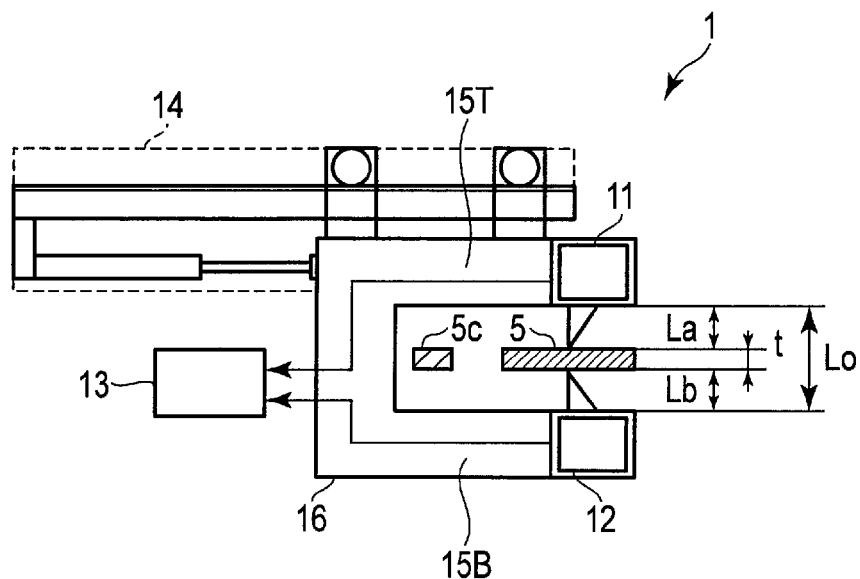
FIG. 2 is a cross-sectional view showing the structure of a thickness measurement apparatus shown in FIG. 1.

In general, according to an embodiment, a thickness measurement system continuously measures a thickness of a conveyed plate as a measurement target. The system includes a first thickness measurement apparatus, a second thickness measurement apparatus, a mode setter, a position setter, a speed detector and a calculator. The first thickness measurement apparatus and the second thickness measurement apparatus each measure the thickness of the measurement target using a laser. The first thickness measurement apparatus is disposed on an upstream side.

The second thickness measurement apparatus is disposed on a downstream side in such a manner that a measurement position for the first thickness measurement apparatus and a measurement position for the second thickness measurement apparatus are separated from each other by a predetermined distance in a traveling direction of the measurement target.

The mode setter periodically sets a "calibration" mode or a "measurement" mode in a switchable manner as an operation mode for the first thickness measurement apparatus, while synchronously setting a "measurement" mode or a "measurement value correction" mode in a switchable manner as an operation mode for the second thickness measurement apparatus.

The position setter sets, in accordance with the operation mode, a position of the first thickness measurement apparatus at a measurement position where the measurement target is measured or a calibration position where a reference object disposed at a position different from a position of the measurement target is measured, with a measurement result calibrated.

The speed detector detects a traveling speed of the measurement target.

The calculator calculates and outputs the thickness of the measurement target at regular intervals based on measurement results from the first thickness measurement apparatus and the second thickness measurement apparatus and a detection result from the speed detector.

The calculator selectively outputs the measurement result from the second thickness measurement apparatus set in the "measurement" mode when the first thickness measurement apparatus is in the "calibration" mode. When the first thickness measurement apparatus is in the "measurement" mode, the calculator delays the measurement result obtained from the upstream-side first thickness measurement apparatus after calibration for the first thickness measurement apparatus is completed, based on a detection speed obtained by the speed detector and a separation distance between the first thickness measurement apparatus and the second thickness measurement apparatus, to allow the measurement position for the first thickness measurement apparatus to coincide with the measurement position for the second thickness measurement apparatus.

The calculator determines a difference between the measurement results as a correction value.

The calculator corrects the thickness measurement result from the second thickness measurement apparatus set in the "measurement value correction" mode.

An embodiment will be described below with reference to FIGS. 1 to 4. First, a thickness measurement system 100 according to the present embodiment will be described.

FIG. 1 is a block diagram showing a configuration of the thickness measurement system 100. FIG. 2 is a cross-sectional view illustrating the structure of a first thickness measurement apparatus 1 or a second thickness measurement apparatus 2 as seen in a conveying direction of a measurement target (a rolled plate) 5 shown in FIG. 1. Furthermore, FIG. 3 is a plan view showing that the first thickness measurement apparatus 1 and the second thickness measurement apparatus 2 are provided at a predetermined distance Ld from each other in the conveying direction of the measurement target 5.

As shown in FIG. 1, the thickness measurement system 100 includes the first thickness measurement apparatus 1 and the second thickness measurement apparatus 2, an operation mode setting section 3 that sets an operation mode for each of the first and second thickness measurement apparatuses 1 and 2, and a speed detector 4 that measures the measurement target 5 to be measured.

The first thickness measurement apparatus 1 and the second thickness measurement apparatus 2 have the same configuration, which, as shown in FIG. 2, includes a C-shaped frame 15 having an upper arm portion 15T and a lower arm portion 15B, a pair of laser range finders 11 and 12 with measurement surfaces disposed opposite the arm portions 15T and 15B, respectively, a thickness measurement section 13 that determines the thickness of the measurement target 5 based on measurement results from the laser range finders 11 and 12, and a position setting section 14 that moves the position of the C-shaped frame 15 to a measurement position and to a calibration position based on a mode set by the operation mode setting section 3. The C-shaped frame 15 is arranged such that the measurement surfaces of the first thickness measurement apparatus 1 and the second thickness measurement apparatus 2 lie opposite a top surface and a bottom surface, respectively, of the measurement target 5. The distance between the first thickness measurement apparatus 1 and the second thickness measurement apparatus 2 is denoted by Lo. The thickness measurement section 13 may be fixed to the C-shaped frame 15 as shown in FIG. 2 but may be provided separately from the C-shaped frame 15.

Figure 3:
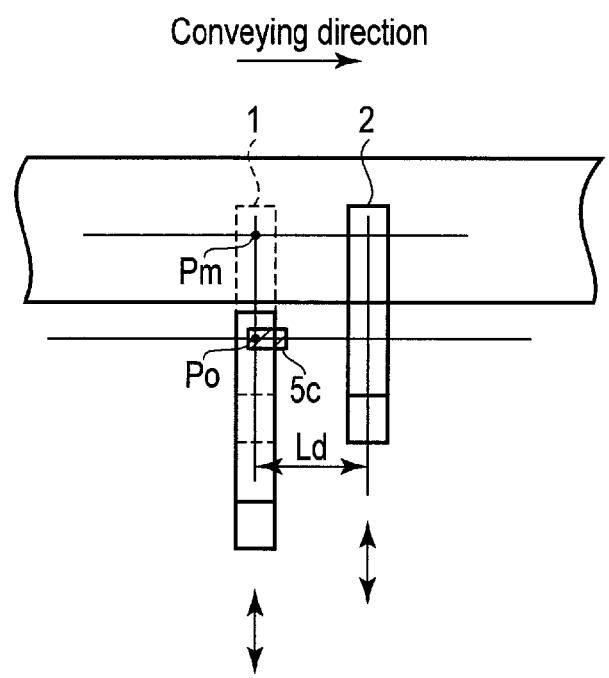
FIG. 3 is a plan view showing an arrangement of the thickness measurement apparatuses in the thickness measurement system shown in FIG. 1.

The position setting section 14 moves the position of the C-shaped frame 15, to which the pair of laser range finders 11 and 12 is fixed, to a calibration position Pc and to a measurement position Pm, as shown in FIG. 3. The position setting section 14 includes a driving mechanism that moves the position of the C-shaped frame 15 to a set position in a direction orthogonal to the conveying direction of the measurement target 5 as shown in FIG. 2. Specifically, the driving mechanism includes a rail that regulates a traveling direction of the C-shaped frame 15 and a driving section that allows the C-shaped frame to travel on the rail. However, this configuration is illustrative, and the configuration may be change in various ways provided that potential impacts and vibrations applied to the laser range finders 11 and 12, mounted on the C-shaped frame 15, fall within an acceptable range and that a traveling speed and a stop position can be controlled and set. Furthermore, FIG. 1 shows the calibration position (shown by a solid line) and the measurement position (shown by a dotted line) for the first thickness measurement apparatus 1 and only the measurement position for the second thickness measurement apparatus 2. However, the calibration position for the second thickness measurement apparatus 2 is similar to the calibration position for the first thickness measurement apparatus 1.

Now, an operation mode set by the operation mode setting section 3 will be described with reference to FIG. 3. The operation mode setting section 3 sends operation mode setting signals indicating a calibration mode and a measurement mode to each of the first and second thickness measurement apparatuses 1 and 2. The first thickness measurement apparatus 1 and the second thickness measurement apparatus 2 allow the position setting section 14 to receive the operation mode setting signal sent by the operation mode setting section 3. The position setting section 14 determines the measurement/calibration mode and the measurement or calibration position based on the operation mode setting signal, and moves the thickness measurement apparatuses 1 and 2 to the respective positions. Once the movement is complete, the position setting section 14 provides a position setting completion signal to the operation mode setting section 3.

Furthermore, upon receiving the position setting completion signals sent by the first laser thickness measurement apparatus 1 and the second laser thickness measurement apparatus 2 to recognize that the thickness measurement apparatuses have been moved to the respective positions corresponding to the set operation modes, the operation mode setting section 3 transmits a signal for an instruction to start processing in the set operation mode to the first thickness measurement apparatus 1 and to the second thickness measurement apparatus 2.

As shown in FIG. 3, the first thickness measurement apparatus 1 and the second thickness measurement apparatus 2 move in a direction orthogonal to the conveying direction of the measurement target 5. Normally, the first thickness measurement apparatus 1, located upstream of the measurement target 5 in the conveying direction thereof, is placed at the calibration position Pc, located away from a conveying position of the measurement target 5. Furthermore, the second thickness measurement apparatus 2 is placed at the preset measurement position Pm, located downstream of the first thickness measurement apparatus 1 at a predetermined distance Ld therefrom and where the measurement target 5 is measured.

Figure 4:
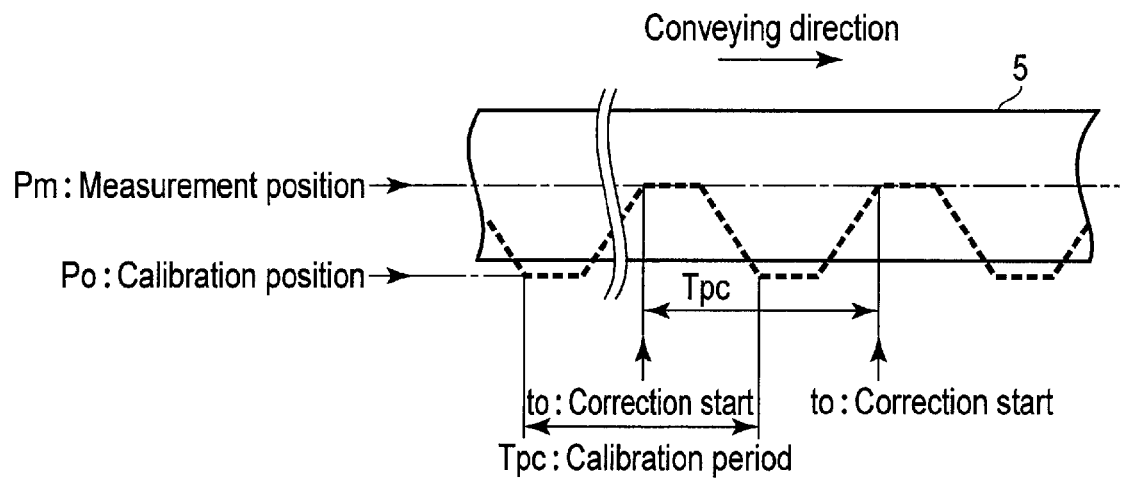
FIG. 4 is an arrangement plan illustrating a measurement position and a calibration position for the thickness measurement system shown in FIG. 1.
Figure 5:
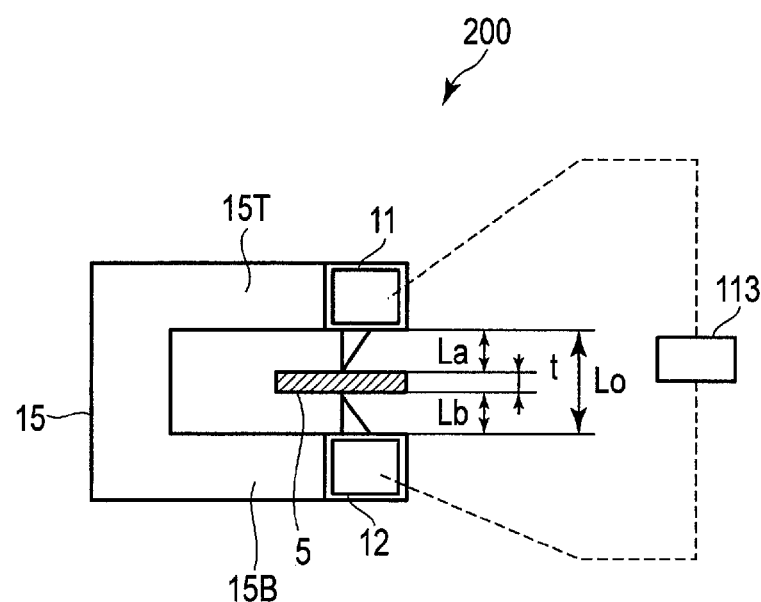
FIG. 5 is a cross-sectional view showing the structure of a laser thickness measurement system.

Additionally, the first thickness measurement apparatus 1 performs thickness calibration at a preset calibration period Tpc at the calibration position using a thickness reference plate 5c, as shown in FIG. 4. The calibration period Tpc is preset based on a measurement accuracy desired for the first thickness measurement apparatus 1 and a temperature drift property associated with a change in the ambient temperature at which the first thickness measurement apparatus 1 is installed.

For example, it is assumed that, when a change in ambient temperature is 10° C./10 hours, the first thickness measurement apparatus 1 has a temperature drift of 0.5% and a desired accuracy of 0.1%. Then, assuming that the temperature drift changes linearly relative to time (0.5%/10 hours), the calibration period Tpc needs to be 2 hours or shorter.

When the measurement mode is specified using the operation mode setting signal, the calibrated first thickness measurement apparatus 1 moves to the measurement position Pm and transmits the position setting completion signal to start measurement. When the first thickness measurement apparatus 1 is set at the measurement position Pm and starts measurement, the operation mode setting section 3 receives the position setting completion signal for this measurement position and transmits a correction start signal to the second thickness measurement apparatus 2, which is measuring the thickness.

Now, a correction calculation section 13a provided in the thickness measurement section 13 of the second thickness measurement apparatus 2 will be described. Since the measurement position for the measurement target 5 in the traveling direction thereof is at the distance Ld from the. measurement position for the second thickness measurement apparatus 2, the correction calculation section 13a receives a traveling speed signal for the measurement target 5 obtained by the speed detector 4 to delay the measurement value from the first thickness measurement apparatus 1 by an amount equivalent to the distance Ld. The correction calculation section 13a thus allows the measurement position for the first thickness measurement apparatus 1 to coincide with the measurement position for the second thickness measurement apparatus 2 and determines the difference between the measurement value from the first thickness measurement apparatus 1 and the measurement value from the second thickness measurement apparatus 2 as a correction value. The correction value is stored until a timing when the next "thickness correction" is performed.

Now, the thickness measurement system 100 configured as described above will be described with reference to FIG. 1 and FIG. 4.

The operation mode setting section 3 allows the first thickness measurement apparatus 1 and the second thickness measurement apparatus 2 to be pre-calibrated for the preset distance Ld in the traveling direction of the measurement target 5 using the thickness reference plate 5c for each of the thickness measurement apparatuses, and then sets the first thickness measurement apparatus 1 and the second thickness measurement apparatus 2 at a calibration position and a measurement position which correspond to initial positions.

Then, the operation mode setting section 3 sets "calibration" at the preset calibration period Tpc for the first thickness measurement apparatus 1, placed on an upstream side in the traveling direction. Then, the first thickness measurement apparatus 1 moves to the preset calibration position and performs a thickness calibration process using the preset thickness reference plate 5c. On the other hand, the operation mode setting section 3 sets "measurement" for the second thickness measurement apparatus 2, placed on a downstream side in the traveling direction. Then, the second thickness measurement apparatus 2 continuously measures the thickness of the measurement target 5 at a predetermined period.

Then, when the next calibration period Tpc starts, the operation mode setting section 3 sets "measurement" for the first thickness measurement apparatus 1, which has been completely calibrated. Upon receiving, from the first thickness measurement apparatus 1, a measurement position setting completion signal indicating that the first thickness measurement apparatus 1 has been set at the measurement position, the operation mode setting section 3 sends a "thickness correction" processing start signal to the second thickness measurement apparatus 2. Upon receiving the "thickness correction" processing start signal, the second thickness measurement apparatus 2 receives a first thickness measurement value from the first thickness measurement apparatus 1 and a traveling speed value for the measurement target 5 from the speed detector 4, and delays the first thickness measurement value from the first thickness measurement apparatus 1 until a position corresponding to the distance Ld is reached in the traveling direction. The operation mode setting section 3 determines the difference between the first thickness measurement value and a second thickness measurement value from the second thickness measurement apparatus 2 as a correction value. The operation mode setting section 3 then corrects the second thickness measurement value during measurement.

As described above, the present embodiment involves calibrating one of the thickness measurement apparatuses at the preset calibration period at the calibration position, determining the difference between the measurement value from this thickness measurement apparatus and the measurement value from the other thickness measurement apparatus performing measurement, and correcting the difference at the preset calibration period. Thus, the present embodiment can eliminate the adverse effect of measurement errors caused by a variation in the distance between support points for the laser range finders in the thickness measurement apparatuses 1 and 2 which variation results from a change in temperature. This configuration avoids the use of radiation thickness gauges, eliminating the need for special safety management. Furthermore, the use of both thickness measurement apparatuses of the pair of thickness measurement apparatuses enables continuous measurement.

Namely, the present embodiment allows to provide a thickness measurement system and a thickness measurement method which eliminate the adverse effect of measurement errors caused by a variation in the distance between support points for a pair of laser range finders in thickness measurement apparatuses which variation results from a change in temperature, the system and method enabling continuous measurement while eliminating the need for special measures for safety management.

The present invention is not limited to the above-described embodiment proper. In practice, the embodiment may be varied without departing from the spirit of the invention. Furthermore, various inventions may be formed by appropriately combining a plurality of the components disclosed in the embodiment. For example, some of the components illustrated in the embodiment may be deleted. Moreover, components of different embodiments may be appropriately combined together.

What is claimed is:

1. A thickness measurement system configured to continuously measure a thickness of a conveyed plate as a measurement target, the system comprising:
    a first thickness measurement apparatus and a second thickness measurement apparatus each measuring the thickness of the measurement target using a laser, the first thickness measurement apparatus being disposed on an upstream side and the second thickness measurement apparatus being disposed on a downstream side in such a manner that a measurement position for the first thickness measurement apparatus and a measurement position for the second thickness measurement apparatus are separated from each other by a predetermined distance in a traveling direction of the measurement target;
    an operation mode setting section configured to periodically set a "calibration" mode or a "measurement" mode in a switchable manner as an operation mode for the first thickness measurement apparatus, while synchronously setting a "measurement" mode or a "measurement value correction" mode in a switchable manner as an operation mode for the second thickness measurement apparatus;
    position setting means configured to set, in accordance with the operation mode, a position of the first thickness measurement apparatus at a measurement position where the measurement target is measured or a calibration position where a reference object disposed at a position different from a position of the measurement target is measured, with a measurement result calibrated;
    a speed detector configured to detect a traveling speed of the measurement target; and
    thickness calculation means configured to calculate and output the thickness of the measurement target at regular intervals based on measurement results from the first thickness measurement apparatus and the second thickness measurement apparatus and a detection result from the speed detector,
    wherein the thickness calculation means selectively outputs the measurement result from the second thickness measurement apparatus set in the "measurement" mode when the first thickness measurement apparatus is in the "calibration" mode, and when the first thickness measurement apparatus is in the "measurement" mode, delays the measurement result obtained from the upstream-side first thickness measurement apparatus after calibration for the first thickness measurement apparatus is completed, based on a detection speed obtained by the speed detector and a separation distance between the first thickness measurement apparatus and the second thickness measurement apparatus, to allow the measurement position for the first thickness measurement apparatus to coincide with the measurement position for the second thickness measurement apparatus, determines a difference between the measurement results as a correction value, and corrects the thickness measurement result from the second thickness measurement apparatus set in the "measurement value correction" mode.

2. The thickness measurement system of claim 1, wherein the first thickness measurement apparatus and the second thickness measurement apparatus have an identical configuration and each comprise a C-shaped frame comprising arm portions disposed above and below the measurement target, respectively, a pair of laser range finders disposed on the respective arm portions opposite each other, a thickness measurement section configured to determine the thickness of the measurement target based on distance outputs from the laser range finders, and a position setting section configured to set the C-shaped frame 15 at a predetermined measurement position and at a predetermined calibration position based on an operation mode set by the operation mode setting section.

3. A thickness measurement method for continuously measuring a thickness of a conveyed plate as a measurement target, the method comprising:
    placing a first thickness measurement apparatus on an upstream side and a second thickness measurement apparatus on a downstream side in such a manner that a measurement position for the first thickness measurement apparatus and a measurement position for the second thickness measurement apparatus are separated from each other by a predetermined distance in a traveling direction of the measurement target, the first thickness measurement apparatus and the second thickness measurement apparatus measuring the thickness of the measurement target using a laser;
    periodically setting a "calibration" mode or a "measurement" mode in a switchable manner as an operation mode for the first thickness measurement apparatus, while synchronously setting a "measurement" mode or a "measurement value correction" mode in a switchable manner as an operation mode for the second thickness measurement apparatus;

setting, in accordance with the operation mode, a position of the first thickness measurement apparatus at a measurement position where the measurement target is measured or a calibration position where a reference object disposed at a position different from a position of the measurement target is measured, with a measurement result calibrated;

detecting a traveling speed of the measurement target; and calculating and outputting the thickness of the measurement target at regular intervals based on measurement results from the first thickness measurement apparatus and the second thickness measurement apparatus and a detection result from the speed detector, wherein the thickness calculation comprises selectively outputting the measurement result from the second thickness measurement apparatus set in the "measurement" mode when the first thickness measurement apparatus is in the "calibration" mode, and when the first thickness measurement apparatus is in the "measurement" mode, delaying the measurement result obtained from the upstream-side first thickness measurement apparatus after calibration for the first thickness measurement apparatus is completed based on a detection speed obtained by the speed detector and a separation distance between the first thickness measurement apparatus and the second thickness measurement apparatus, to allow the measurement position for the first thickness measurement apparatus to coincide with the measurement position for the second thickness measurement apparatus, determining a difference between the measurement results as a correction value, and correcting the thickness measurement result from the second thickness measurement apparatus set in the "measurement value correction" mode.

* * * * *